United States Patent
Liu et al.

(10) Patent No.: US 12,015,473 B2
(45) Date of Patent: Jun. 18, 2024

(54) METHOD AND APPARATUS FOR SEQUENCE DETERMINATION IN WIRELESS TRANSMISSION

(71) Applicant: Lenovo (Beijing) Ltd., Beijing (CN)

(72) Inventors: Hongmei Liu, Changping District (CN); Zhi Yan, Xicheng District (CN); Yuantao Zhang, Dongcheng District (CN); Bingchao Liu, Changping District (CN); Haiming Wang, Xicheng District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 25 days.

(21) Appl. No.: 18/000,061

(22) PCT Filed: Jun. 19, 2020

(86) PCT No.: PCT/CN2020/097215
§ 371 (c)(1),
(2) Date: Nov. 28, 2022

(87) PCT Pub. No.: WO2021/253435
PCT Pub. Date: Dec. 23, 2021

(65) Prior Publication Data
US 2023/0224027 A1    Jul. 13, 2023

(51) Int. Cl.
*H04B 7/185*    (2006.01)
*H04W 48/16*    (2009.01)

(52) U.S. Cl.
CPC ........ *H04B 7/18563* (2013.01); *H04W 48/16* (2013.01)

(58) Field of Classification Search
CPC ............................ H04B 7/18563; H04W 48/16
See application file for complete search history.

(56) References Cited

U.S. PATENT DOCUMENTS 11,737,115 B2 *  8/2023  Kim ................. H04L 5/0053 370/329
2020/0053782 A1 * 2/2020  Zhang ............... H04L 5/0053
(Continued)

FOREIGN PATENT DOCUMENTS

WO    2020030036 A1    2/2020

OTHER PUBLICATIONS

"Technical Specification Group Radio Access Network", 3GPP, 3GPP TS 38.211 V15.8.0, Physical channels and 1-22 modulation (Release 15) [retrieved Nov. 9, 2022]. Retrieved from the Internet <https://www.etsi.org/deliver/etsi_ts/138200_138299/138211/15.08.00_60/ts_138211v150800p.pdf>., Dec. 31, 2019, 100 Pages.
(Continued)

*Primary Examiner* — Freshteh N Aghdam
(74) *Attorney, Agent, or Firm* — FIG. 1 Patents

(57) ABSTRACT

Embodiments of the present application are related to a method and apparatus for sequence determination in wireless transmission. According an embodiment of the present application, an exemplary method includes: receiving configuration information indicating at least one offset value associated with a kind of sequence, wherein each offset value corresponds to a second time domain index offset relative to a first time domain index determined based on synchronization signal block (SSB) associated with the kind of sequence; determining at least one second time domain index associated with the kind of sequence based on the at least one offset value correspondingly; and determining at least one sequence correspondingly based on the at least one second time domain index. Accordingly, embodiments of the present application can allow interference randomization during sequence generation in spite of the unfavorable impact on time domain index.

20 Claims, 5 Drawing Sheets

(56) References Cited

U.S. PATENT DOCUMENTS

2020/0329494 A1* 10/2020 Mondal .............. H04W 74/0808
2024/0040579 A1* 2/2024 Liu ....................... H04W 72/23

OTHER PUBLICATIONS

CATT, "Discussion on support of unaligned frame boundary inter-band CA", 3GPP TSG RAN WG1 Meeting #98bis, R1-1910326, Chongqing, China [retrieved Nov. 9, 2022]. Retrieved from the Internet <https://www.3gpp.org/ftp/tsg_ran/wg1_rL 1/TSGR1_98b/Docs/>., Oct. 2019, 3 Pages.

CATT, "Draft Feature lead summary on AI 7.2.4.3 #2 Sidelink synchronization mechanism", 3GPP TSG RAN WG1 Meeting #100bis, R1-200xxxx, e-Meeting [retrieved Nov. 9, 2022]. Retrieved from the Internet <https://www.3gpp.org>., Apr. 2020, 29 Pages.

CMCC, "Discussion on supporting TDD duplex scheme for NTN", 3GPP TSG RAN WG1 #99, R1-1912538, Reno, USA [retrieved Nov. 9, 2022]. Retrieved from the Internet <https://www.3gpp.org/ftp/tsg_ran/WG1_RL1/TSGR1_99/Docs>., Nov. 2019, 11 Pages.

ITL, "DMRS sequence design for NR-PBCH", 3GPP TSG RAN WG1 Meeting #89, R1-1711353, Qingdao, P.R. [retrieved Nov. 9, 2022]. Retrieved from the Internet <https://www.3gpp.org/ftp/tsg_ran/WG1_RL1/TSGR1_AH/NR_AH_1706/Docs>., Jun. 2017, 5 Pages.

PCT/CN2020/097215, "International Preliminary Report on Patentability", PCT Application No. PCT/CN2020/097215, dated Dec. 29, 2022, 5 pages.

PCT/CN2020/097215, "International Search Report and Written Opinion", PCT Application No. PCT/CN2020/097215, dated Mar. 18, 2021, 7 pages.

* cited by examiner

METHOD AND APPARATUS FOR SEQUENCE DETERMINATION IN WIRELESS TRANSMISSION

TECHNICAL FIELD

Embodiments of the present application are directed to wireless communication technology, and more particularly directed to sequence determination in wireless transmission.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), satellite and high-altitude platforms may be utilized as relay devices in communications related to ground devices such as user equipment (UE). Network or segment of network using radio frequency (RF) resources on board a satellite or an airborne aircraft may be referred to as a non-terrestrial network (NTN). In an NTN network, some or all functions of a base station (BS) may be deployed in a satellite or an airborne aircraft.

On the other hand, in a wireless network, channel sequences or reference signal sequences are generated or determined dependent on time domain index for interference randomization. The time domain index can be a slot index, a symbol index etc. Thus, different downlink (DL) and uplink (UL) time domain indexes for the same time instance may result in serious inter-UE cross-link interference. Different DL time domain indexes for the same time instance can be caused by a large propagation delay between the transmitter and the receiver of a UE, or caused by a large cell coverage area, which cannot be avoided in some wireless systems/networks, especially, in an NTN network.

Thus, there is a need for further complementing and improving the technical solutions on sequence determination in wireless transmission to at least reduce the impact caused by large delay and large cell coverage etc.

SUMMARY OF THE DISCLOSURE

One object of the present application is to provide a method and apparatus for sequence determination in wireless transmission.

According to an embodiment of the present application, a method includes: receiving configuration information indicating at least one offset value associated with a kind of sequence, wherein each offset value corresponds to a second time domain index offset relative to a first time domain index determined based on synchronization signal block (SSB) associated with the kind of sequence; determining at least one second time domain index associated with the kind of sequence based on the at least one offset value correspondingly; and determining at least one sequence correspondingly based on the at least one second time domain index.

According to another embodiment of the present application, a method includes: configuring information indicating at least one offset value associated with a kind of sequence, wherein each offset value corresponds to a second time domain index offset relative to a first time domain index determined based on synchronization signal block (SSB) associated with the kind of sequence; determining at least one second time domain index based on the at least one offset value respectively; and determining at least one sequence associated with the kind of sequence correspondingly based on the at least one second time domain index.

In some embodiments of the present application, the kind of sequence is one of physical uplink control channel (PUCCH) sequence, physical downlink shared channel (PDSCH) demodulation reference signal (DMRS) sequence, physical uplink shared channel (PUSCH) DMRS sequence, sounding reference signal (SRS) sequence for transmission and SRS sequence for reception. Both the first time domain index and the second time domain index are in a unit of at least one of a slot and a symbol.

According to some embodiments of the present application, the at least one offset value is determined by common timing advance (TA) for uplink transmission. The at least one offset value is calculated by rounding a corresponding value of the common TA to the number of at least one slot and symbol with respect to a subcarrier spacing (SCS) associated with the kind of sequence. The at least one offset value is explicitly configured by at least one of radio resource control (RRC) signaling, medium access control (MAC) control element (CE) and downlink control information (DCI) associated with the kind of sequence. In some other embodiments of the present application, in the case that the kind of sequence is one of PDSCH DMRS sequence or PUSCH DMRS sequence, the at least one offset value is implicitly determined by DMRS port information in at least one of RRC signaling and DCI associated with the kind of sequence. In some yet other embodiments of the present application, in the case that the kind of sequence is one of PDSCH DMRS sequence or PUSCH DMRS sequence, the at least one offset value is implicitly determined by DMRS scrambling identifier information in at least one of RRC signaling and DCI associated with the kind of sequence.

In some embodiments of the present application, the at least one offset value is separated configured for different kinds of sequence. In some other embodiments of the present application, the at least one offset value is shared among different kinds of sequence.

In addition, some embodiments of the present application also provide apparatuses for performing a method, e.g., a method as stated above.

Embodiments of the present application can solve the technical problems concerning on sequence determination in wireless transmission, reducing impact on interference randomization during sequence generation or determination caused by large propagation delay and large cell coverage area, which will greatly facilitate the evolution of wireless communication technology.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G (NR), 3GPP LTE, and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
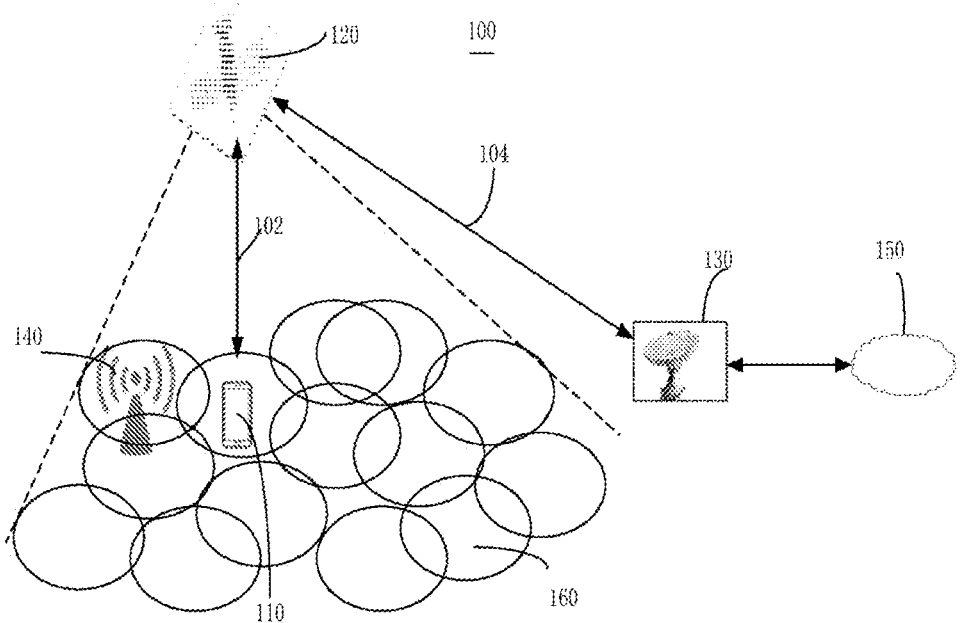
FIG. 1 illustrates a wireless communication system according to an embodiment of the present application.

FIG. 1 is a schematic diagram illustrating an exemplary wireless communication system according to some embodiments of the present application.

Referring to FIG. 1, the shown exemplary wireless communication system is an exemplary NTN network 100 in which the techniques, processes and methods described herein can be implemented, in accordance with various embodiments of the present application. In other embodiments of the present application, the wireless communication system may be other type of networks.

Generally, to extend the coverage and availability of wireless communication systems, some or all functions of a BS may be deployed in a satellite. That is, in the NTN network, a satellite may be also referred to as a BS. For example, a satellite may generate beams over a certain service area, which may also be referred to as a cell coverage area. The concept of cell with respect to a terrestrial BS may similarly apply to a satellite serving as a BS. Such network or segment of network using RF resources on board a satellite or an airborne aircraft may be referred to as an NTN network. Hereafter, the BS(s) illustrated in the specification all cover any type of devices with the substantial function of a BS, including a satellite 120, a terrestrial BS 140 or the like.

As shown in FIG. 1, the NTN network 100 includes at least one UE 110 and at least one satellite 120. The UE(s) 110 communicates with the satellite 120 over a service link 102, which has both an uplink from the UE 101 to the satellite 120 and a downlink from the satellite 120 to the UE 110. The UE(s) 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present disclosure, the UE(s) 110 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 110 includes wearable devices, such as smart watches, fitness bands, optical head-mounted displays, or the like. Moreover, the UE(s) 110 may be referred to as a subscriber unit, a mobile, a mobile station, a user, a terminal, a mobile terminal, a wireless terminal, a fixed terminal, a subscriber station, a user terminal, or a device, or described using other terminology used in the art.

Satellite(s) 120 may include low earth orbiting (LEO) satellites, medium earth orbiting (MEO) satellites, geostationary earth orbiting (GEO) satellites, as well as highly elliptical orbiting (HEO) satellites. In some embodiments of the present application, alternatively, a satellite 120 may be an unmanned aircraft systems (UAS) platform. The UAS platform(s) may include tethered UAS and lighter than air (LTA) UAS, heavier than air (HTA) UAS, and high altitude platform (HAP) UAS.

The satellite 120 may provide a plurality of geographic cells 160 for serving UEs 110 located in one or more of the geographic cells. In FIG. 1, exemplary UE(s) may be a normal mobile terminal, which can wirelessly communicate with the satellite 120 via a communications link, such as service link or radio link in accordance with a NR access technology (e.g., a NR-Uu interface). As also shown in FIG. 1, the satellite 120 may also communicates with a gateway 130 or an on earth (terrestrial) BS 140 via a communication link, which may be a feeder link 102 or radio link in accordance with NR access technologies or other technologies. In accordance with various embodiments, the satellite 120 may be implemented with either a transparent or a regenerative payload. When the satellite 120 carries a "transparent" payload, it performs only radio frequency filtering, frequency conversion and/or amplification of signals on board. Hence, the waveform signal repeated by the payload is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload (re, all or part of base station functions (e.g., a gNB, eNB, etc.) are implemented on board.

The gateway 130 may be coupled to a data network 150 such as, for example, the Internet, terrestrial public switched telephone network, mobile telephone network, or a private server network, etc. The gateway 130 and the satellite 120 communicate over a feeder link 120, which has both a feeder uplink from the gateway to the satellite 120 and a feeder downlink from the satellite 120 to the gateway 130. Although a single gateway 130 is shown, some implementations will include more gateways, such as five, ten, or more.

One or more terrestrial BSs 140 (i.e., not airborne or spaceborne) are provided within a typical terrestrial communication network, which provides geographical radio coverage, wherein the UEs 110 that can transmit and receive data within the radio coverage (cell coverage) of the terrestrial BS 140. In the terrestrial communication network, a terrestrial BS 140 and a UE 110 can communicate with each other via a communication link, e.g., via a downlink radio frame from the terrestrial BS 140 to the UE 110 or via an uplink radio frame from the UE 110 to the terrestrial BS 140.

Although a limited number of UEs 110 and satellites 120 etc., are illustrated in FIG. 1, it is contemplated that the wireless communication system 100 may include any number of UEs 110, satellites 120, and/or other network components.

Generally, for a UE 110, there is a propagation delay between its transmitter and receiver. When the propagation delay is larger than one or more symbols, time domain indexes (also can be referred to as "number") for DL reception and UL transmission in a UE, e.g., UE1 at the same time instance may be different, which is exemplarily illustrated in FIG. 2. For clearness, the time length in the time domain is counted in the unit of symbol, wherein each block in FIG. 2 represents a symbol.

Figure 2:
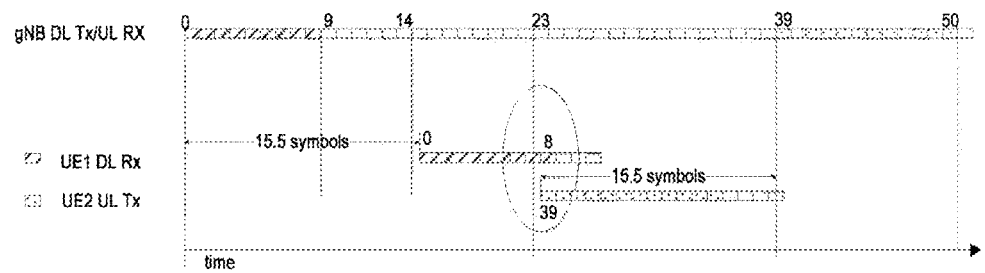
FIG. 2 shows an exemplary diagram for illustrating different time domain indexes for DL reception and UL transmission respectively in a UE at the same time instance.

Referring to FIG. 2, the network side may schedule, e.g., by a gNB to perform DL transmission (DL Tx) to UE1 (corresponding to DL reception for UE1) from symbol #0 to symbol #8 and perform UL reception for UE2 (corresponding to UL transmission for UE2) beginning at symbol #39 until symbol #50. However, due to a large propagation delay, such as being 15.5 symbols, U1 has to delay the DL reception to start from symbol #15.5 rather than symbol #0 in the time domain, and has advanced the UL transmission to start from symbol #23.5 in the time domain. Accordingly, for a specific time instance (e.g., symbol #23 or symbol #24 scheduled in the network side) in UE1, it is symbol #8 for the delayed DL reception in UE1, while it has to also be symbol #39 for the ahead UL transmission in UE2. Thus, for the same time instance, time domain indexes for DL reception in UE1 and that for UL transmission in UE2 are different due to a large propagation delay. Since sequences of channel or reference signal are generated (or determined) dependent on time domain index for interference randomization, different time domain indexes for DL reception in UE1 and UL transmission in UE2 at the same time instance may cause seriously interference. That is, when the propagation is too large to be tolerated by the transmission schedule, the transmission in advance of the transmitter to compensate delay may interfere with the delayed reception of receiver.

Figure 3:
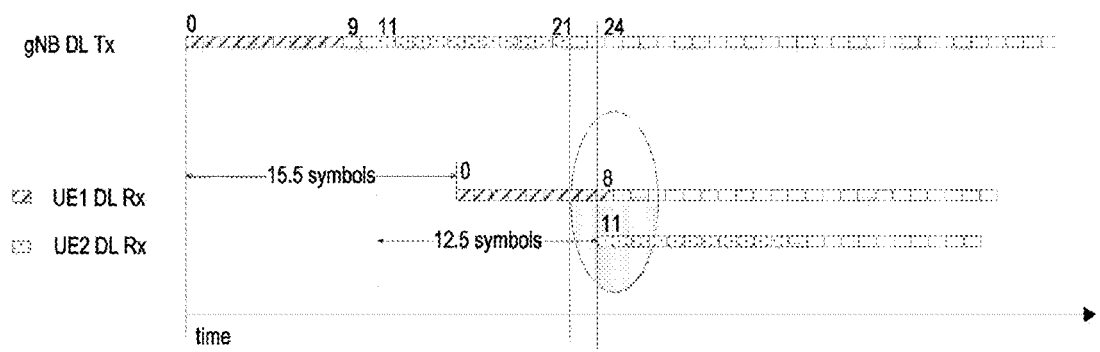
FIG. 3 shows an exemplary diagram for illustrating different time domain indexes for DL receptions of two UEs respectively at the same time instance.

A similar issue may also happen between different UEs 110 within a large cell coverage area. FIG. 3 shows an exemplary diagram for illustrating different time domain indexes for DL receptions of two UEs respectively at the same time instance. For clearness, the time length in the time domain is counted in the unit of symbol, wherein each block in FIG. 3 represents a symbol.

Referring to FIG. 3, UE1 and UE2 are within in a large cell coverage area e.g., defined by a gNB. The gNB may schedule to perform DL Tx to UE1 (corresponding to DL reception for UE1) from symbol #0 to symbol #8, and to perform DL Tx to UE2 (corresponding to DL reception for UE2) from symbol #11 to symbol #21. Meanwhile, the propagation delay of UE1 is 15.5 symbols, and the propagation delay of UE2 is 12.5 symbols. Thus, U1 has to delay the DL reception to start from symbol #15.5 rather than symbol #0 in the time domain, and U2 has to delay the DL reception to start from symbol #23.5 rather than symbol #11 in the time domain. Accordingly, for a specific time instance (e.g., symbol #23 or 24 scheduled in the network side), it is symbol #8 for the delayed DL reception in UE1, while it has to also be symbol #11 for the delayed DL reception in UE2. Thus, for the same time instance, DL time domain indexes for different UEs are different due to a large cell coverage area. Similarly, since sequences of channel or reference signal are generated dependent on time domain index for interference randomization, different time domain indexes for DL reception at the same time instance in different UEs within the same cell coverage area may cause seriously interference. That is, when the cell coverage area is too large to be tolerated by the transmission schedule, the DL receptions in two UEs within the same cell coverage area may interfere with each other.

Methods and apparatuses according to embodiments of the present application can at least solve the above technical problems caused by different time domain indexes at the same time instance, and reduce interference cross links.

Figure 4:
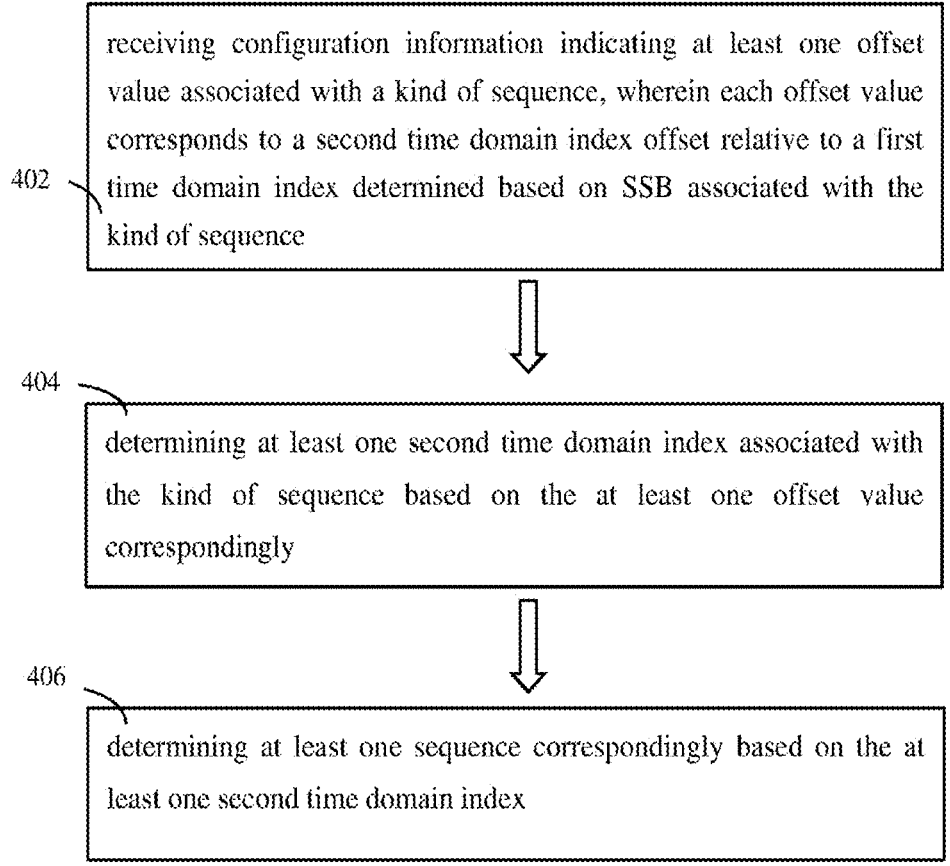
FIG. 4 is a flow chart illustrating an exemplary method for sequence determination in wireless transmission according to an embodiment of the present application.

FIG. 4 is a flow chart illustrating an exemplary method for sequence determination in wireless transmission according to an embodiment of the present application, which can be performed a UE 110 or the like.

Referring to FIG. 4, according to an embodiment of the present application, a method for sequence determination may include receiving configuration information, e.g., from a BS, indicating at least one offset value associated with a kind of sequence in step 402, wherein each offset value corresponds to a second time domain index offset relative to a first time domain index determined based on synchronization signal block (SSB) associated with the kind of sequence.

The kind of sequence can be various, which are determined dependent on time domain index, e.g. for interference randomization etc. For example, in some embodiments of the present application, the kind of sequence is one of physical uplink control channel (PUCCH) sequence (e.g., PUCCH format 1 sequence), physical downlink shared channel (PDSCH) demodulation reference signal (DMRS) sequence, physical uplink shared channel (PUSCH) DMRS sequence, sounding reference signal (SRS) sequence for transmission and SRS sequence for reception.

Both the first time domain index and the second time domain index are in unit of at least one of a slot and a symbol. For example, in some embodiments of the present application, the first time domain index and the second time domain index are symbol indexes, e.g., symbol #10 and symbol #12 respectively. In some other embodiments of the present application, the first time domain index and the second time domain index are slot indexes, e.g., slot #1 and slot #2. In some other embodiments of the present application, the first time domain index and the second time domain index are slot and symbol indexes, e.g., symbol #10 of slot #1, and symbol #12 of slot #2. That is, offset value(s) can only applied to the time domain index in unit of a symbol index, or only applied to a slot index, or applied to both the symbol index and slot index. The offset value(s) applied to the symbol index and slot index can be the same or different.

The offset value(s) can be explicitly configured by the network side, or can be implicitly indicated by the network side, that is, the UE needs to determine the offset value(s) based on received information. For example, according to some embodiments of the present application, the at least one offset value is determined by common timing advance (TA) for uplink transmission. The at least one offset value is calculated by rounding a corresponding value of the common TA to the number of at least one slot and symbol with respect to a subcarrier spacing (SCS) associated with the kind of sequence. Specifically, based on the time length of an SCS associated with a kind of sequence, e.g., SCS of a channel or SCS of a sequence, the time length of a slot and a symbol can be determined, and then how many slot(s) and symbol(s) can be calculated by rounding a corresponding value of the common TA. For example, an SCS associated with a channel sequence may be 15 KHz, and accordingly a slot associated with the channel sequence is 1 ms and a symbol associated with the channel sequence is about $\frac{1}{14}$ ms. In the case that the value of the common TA command value is 5760, then the absolute time for this common TA command value is 3 ms (0.003 s=5760*16*64/(480*1000*4096)s), then the offset value may be 3 slots and 0 symbols. In some embodiments of the present application, the offset value calculated on the basis of the common TA can be expressed only by the number of symbol due to the calculated slot being zero, e.g., 9 symbols. In some other embodiments of the present application, the offset value calculated on the basis of the common TA can be expressed only by the number of slot due to the number of calculated symbol being zero, e.g., 2 slots (with 0 symbol) or being converted into the number of symbols, e.g., in the case of one slot being converted into 14 symbols, two slots and 2 symbols can be expressed in 30 symbols.

According to some other embodiments of the present application, the at least one offset value is explicitly configured by at least one of radio resource control (RRC) signaling, medium access control (MAC) control element (CE) and downlink control information (DCI) associated with the kind of sequence. For example, in some cases, a BS may explicitly or implicitly indicate a UE one offset value via a RRC signaling. While, in some other cases, a BS may explicitly or implicitly indicate a UE more than one offset value for the same time domain index associated with the kind of sequence via a RRC signaling, and then the UE has to select or selectively determine one from the more than one offset value. To carry the offset value, additional bit(s) may be needed for the corresponding signaling with respect to the current version. For example, additional bit(s) for may be needed for RRC signaling to carry the offset value.

In some other embodiments of the present application, in the case that the kind of sequence is one of PDSCH DMRS sequence and PUSCH DMRS sequence, the at least one offset value is implicitly determined by DMRS port information in at least one of RRC signaling and DCI associated with the kind of sequence. In some yet other embodiments of the present application, in the case that the kind of sequence is one of PDSCH DMRS sequence and PUSCH DMRS sequence, the at least one offset value is implicitly determined by DMRS scrambling identifier information in at least one of RRC signaling and DCI associated with the kind of sequence.

In some embodiments of the present application, the at least one offset value is separately configured for different kinds of sequence. In some other embodiments of the present application, the at least one offset value is shared among different kinds of sequence. More details on the offset value configuration and determination will be illustrated in the following text.

In step 404, at least one second time domain index associated with the kind of sequence will be determined based on the at least one offset value correspondingly. For example, assuming that configuration information indicating an offset value for a first symbol index associated with PUCCH format 1 sequence is received in step 402, the second symbol index associated with PUCCH format 1 sequence will be determined based on the offset value. For example, the second symbol index can be counted by adding the offset value to the first symbol index.

After determining the second time domain index, at least one sequence correspondingly based on the at least one second time domain index will be determined (or generated) in step 406. For example, based on the above second symbol index determined for PUCCH format 1 sequence, a PUCCH format 1 sequence will be determined.

On the network side, a similar sequence determination procedure can be performed. For example, FIG. 5 is a flow chart illustrating an exemplary method for sequence determination in wireless transmission according to an embodiment of the present application, which can be performed on a BS (e.g., a terrestrial BS, a satellite etc.) or the like.

Figure 5:
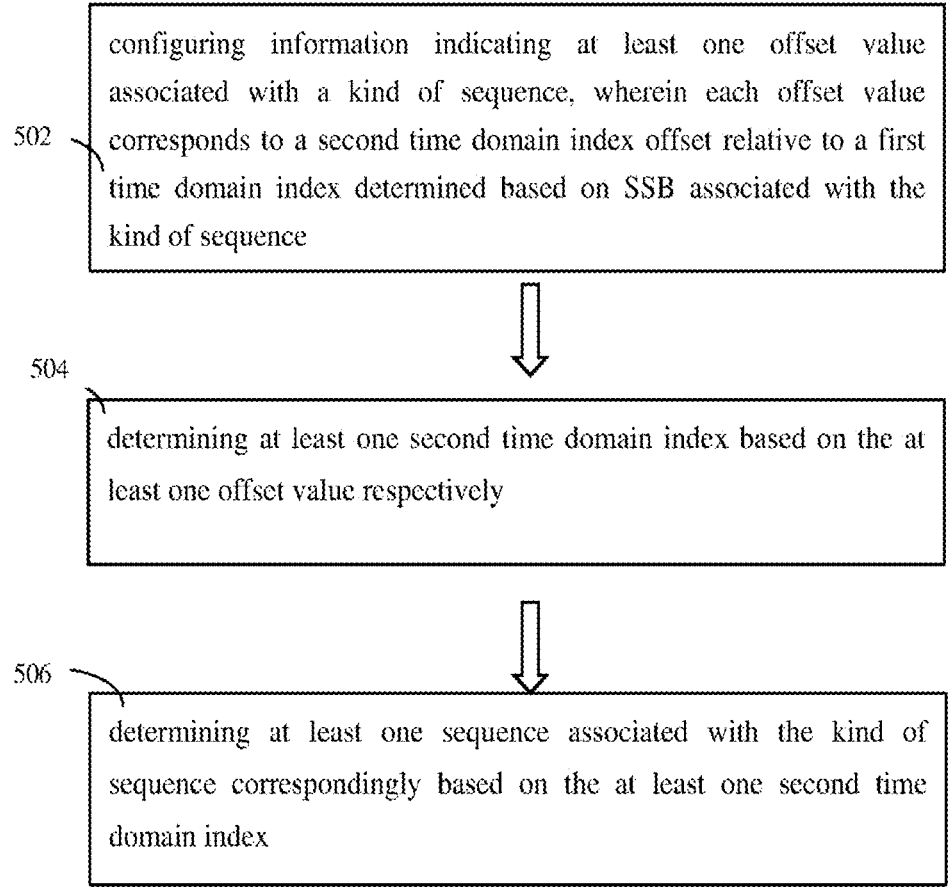
FIG. 5 is a flow chart illustrating an exemplary method for sequence determination in wireless transmission according to another embodiment of the present application.

Referring to FIG. 5, according to an embodiment of the present application, a method for sequence determination may include: configuring information indicating at least one offset value associated with a kind of sequence in step 502, wherein each offset value corresponds to a second time domain index offset relative to a first time domain index determined based on SSB associated with the kind of sequence. The configured information will be transmitted to corresponding UE(s). In some embodiments of the present application, the at least one offset value is separately configured for different kinds of sequence. For example, the offset value associated with PDSCH DRMS sequence and PUSCH sequence are different. In some other embodiments of the present application, the at least one offset value is shared among different kinds of sequence. For example, the offset values for slot and symbol associated with SRS transmission sequence and SRS reception sequence are the same.

The offset value(s) can be explicitly configured or implicitly indicated. For example, according to some embodiments of the present application, the at least one offset value is explicitly configured by at least one of RRC signaling, MAC CE and DCI associated with the kind of sequence. For example, the network side can transmit a RRC signaling to explicitly indicate a UE that the offset value for a second slot relative to a first slot determined based on SSB associated with channel sequence is one slot. In another example, the network side may implicitly indicate a UE an offset value for a second symbol index relative to a first symbol index determined based on SSB associated with channel sequence by the common TA for UL transmission, and the UE needs to determine the offset value for the second symbol index based on the value of the received TA.

In step 504, at least one second time domain index associated with the kind of sequence will be determined based on the at least one offset value correspondingly. After determining the second time domain index, at least one sequence correspondingly based on the at least one second time domain index will be determined (or generated) in step 506.

Since details are similar to the UE side, the above descriptions on sequence determination on the network side are simplified. However, more details on sequence determination will be illustrated in view of two typical sequences, i.e., DMRS sequence and SRS sequence.

DMRS SEQUENCE

When a communication is set up between a BS and a UE, the BS will indicate relative DMRS sequence(s) to the UE to ensure smooth data transmission for DL/UL. For example, there are PDSCH DMRS and PUSCH DMRS (PDSCH/PUSCH DMRS). The sequence generation for DMRS, e.g., PDSCH DMRS and PUSCH DMRS depends on the time domain index, i.e., at least one slot index and symbol index for interference randomization. Specific PDSCH DMRS sequence and PUSCH DMRS sequence generation formula can refer to TS 38.211, which can be concluded that the sequence depends on the slot and symbol index. The slot and symbol number are determined during a cell search procedure by SSB detection.

In the case of being within a large cell coverage area, e.g., in an NTN network, even if the DL transmitting (Tx) and UL receiving (Rx) in the network side, e.g., in a gNB for different UEs are in different time instances, the DL Rx and UL Tx for the different UEs may be at the same time instances as shown in FIG. 3. Thus, inter-UE cross-link interference is more severe in the NTN network. According to embodiments of the present application, interference randomization can be adopted to solve that. For an NTN UE, the transmission layer is usually one layer, and it is more effective to use orthogonal DMRS ports for different UEs sharing the same time instances on the UE side for interference mitigation. Accordingly, the DMRS sequence, e.g., PDSCH DMRS sequence of a victim UE (a UE being interfered) will be the same as the interferer UE's. Thereby, the slot and/or symbol index (i.e., at least one of slot index and symbol index) for generating the DMRS sequence, e.g., PDSCH DMRS and PUSCH DMRS overlapped in the time domain (i.e., at the same time instance) will be the same.

From signaling perspective, according to embodiments of the present application, the slot and/or symbol index for DMRS sequence can be configured rather than being the same as that determined based on SSB, e.g., a slot and/or symbol index detected by UE's reception of SSB. The actual slot and/or symbol index for DMRS sequence can be calculated by the slot and/or symbol index for DMRS sequence determined based on SSB plus the corresponding offset value. The slot and/or index for PUSCH DMRS sequence can also be configured separately from that for the PDSCH DMRS sequence, or shared the same with the PDSCH DMRS sequence. In some embodiments of the present application, the slot and/or symbol index configuration for DMRS sequence can be an offset value with respect to that determined based on SSB.

In some embodiments of the present application, the offset values can be explicitly configured or implicitly determined by the common TA value, e.g., by rounding a corresponding value of the common TA to the number of at least one slot and symbol with respect to an SCS associated with a DMRS sequence.

In some other embodiments of the present application, the at least one offset value is explicitly configured or implicitly indicated by at least one of RRC signaling and DCI associated with DMRS sequence. For example, a BS may explicitly indicate a UE via a RRC signaling that the offset value for the slot index for the DMRS sequence is 1 slot. In some cases, a BS may explicitly configure more than one offset value for the same time domain index associated with DMRS sequence for the same UE. For example, a BS performing dynamic schedule may explicitly configure more than one offset value for slot index associated with DMRS sequence for the same UE via a RRC signaling, and may further indicate the UE to select one from the two or more offset values via DCI according to specific circumstances etc. To carry the offset value, additional bit(s) may be needed for the corresponding signaling with respect to the current version. For example, additional bit(s) may be needed for RRC signaling to carry the offset value for DMRS sequence determination (generation).

In some embodiments of the present application, the at least one offset value can be implicitly indicated or determined by DMRS port information in at least one of RRC signaling and DCI associated with DMRS sequence. For example, a BS may configure that DMRS port #1 associated with offset value #1 slot indicating the offset value is 1 slot, and indicate that to UE(s) via a RRC signaling. In some cases, the BS may configure that DMRS port #0 associated with offset value #0 for no interference, and DMRS port #1 associated with offset value #40 symbols for interference case 1, indicating that to UE(s) via a RRC signaling, and further indicates the UE(s) to select the offset value 40 symbols based on DMRS port #1 associated with offset value #40 symbols by a DCI when interference case 1 happens.

In some embodiments of the present application, the at least one offset value is implicitly determined by DMRS scrambling identifier information in at least one of RRC signaling and DCI associated with DMRS sequence. For example, a BS may configure that scrambling ID #1 associated with offset value #1 slot indicating the offset value is 1 slot, and indicate that to UE(s) via a RRC signaling. In some cases, the BS may configure that scrambling ID #0 associated with offset value #0 for no interference, and scrambling ID #1 associated with offset value #20 symbols for interference case 1, indicating that to UE(s) via a RRC signaling, and further indicates the UE(s) to select the offset value 20 symbols based on scrambling ID #1 associated with offset value #20 symbols by a DCI when interference case 1 happens.

SRS SEQUENCE

For cross-link interference measurement in an NTN network, SRS-reference signal received power (RSRP) can be adopted. On the transmitter side, the time domain index (at least one of slot index and symbol index) for SRS sequence generation is based on UL slot index and UL symbol index. On the receiver side, the time domain index (at least one of slot and symbol index) for SRS reception is based on DL slot index and DL symbol index. They are quite different due to large propagation delay in an NTN system as shown in FIGS. 2 and 3. Accordingly, the SRS sequence to be transmitted and/or the SRS sequence to be measured (received) should have a configurable slot and/or symbol index, which can be determined based on the slot and/or symbol index and an offset value.

From signaling perspective, operations similar to DMRS sequence determination can be adopted for SRS sequence. An offset value can be configured to change the at least one of slot and symbol index for SRS sequence for the UE to transmit SRS with respect to the timing determined by SSB (i.e., the slot and/or symbol determined based on SSB). For example, the offset value can be configured by RRC signaling in the SRS-resource information element (IE). An offset value can also be configured to change at least one the slot and symbol index for SRS sequence for the UE to measure SRS sequence with respect to the timing determined by SSB. The offset value can be configured by RRC signaling in the SRS-resource IE associated with the corresponding report configuration or measurement configuration.

Figure 6:
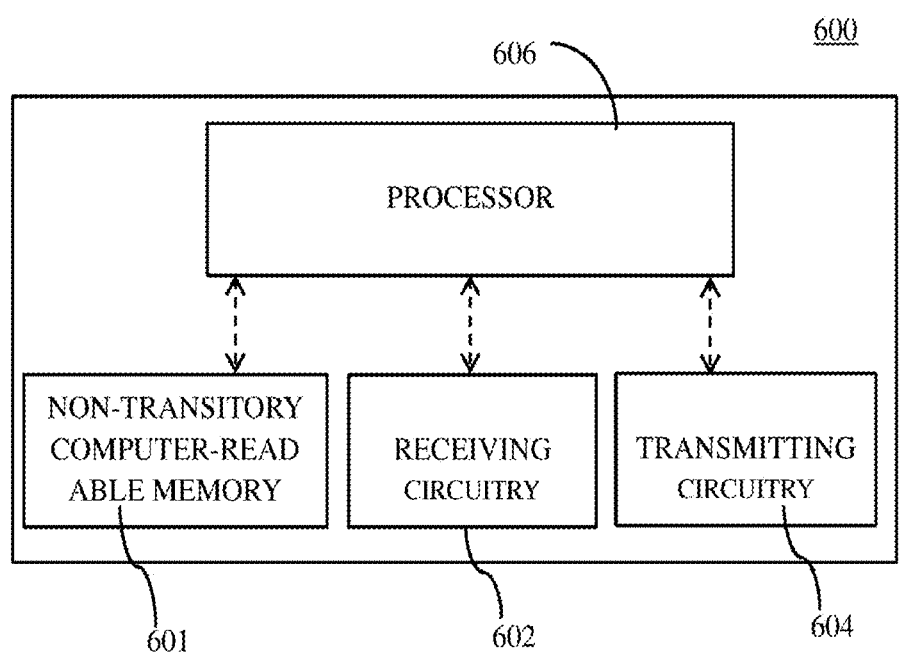
FIG. 6 illustrates a block diagram of an exemplary apparatus in accordance with some embodiments of the present application.

Embodiments of the present application also propose an apparatus for sequence determination in wireless transmission. FIG. 6 illustrates an example block diagram of an apparatus 600 according to some embodiments of the present application.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a network side apparatus (e.g., a terrestrial BS or a satellite) configured to perform a method illustrated in FIG. 5 and the like, or a communication device (e.g., a UE) configured to perform a method illustrated in FIG. 4 or the like.

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 are combined into a single device, such as a transceiver. In certain embodiments of the present application, the apparatus 600 may further include an input device, a memory, and/or other components.

For example, in some embodiments of the present application, the non-transitory computer-readable medium 601 may have stored thereon computer-executable instructions to cause a processor to implement the method with respect to the UE as described above. For example, the computer-executable instructions, when executed, cause the processor 606 interacting with receiving circuitry 602 and transmitting circuitry 604, so as to perform the steps with respect to the UE depicted in FIG. 4.

In some embodiments of the present application, the non-transitory computer-readable medium 601 may have stored thereon computer-executable instructions to cause a processor to implement the method with respect to the BS (including terrestrial BSs, satellites or the like) as described above. For example, the computer-executable instructions, when executed, cause the processor 606 interacting with receiving circuitry 602 and transmitting circuitry 604, so as to perform the steps with respect to the BS (including terrestrial BSs, satellites or the like) depicted in FIG. 5.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method, comprising:
   receiving configuration information indicating at least one offset value associated with a type of sequence, the at least one offset value corresponding to a second time domain index that is offset relative to a first time domain index determined based on a synchronization signal block (SSB) associated with the type of sequence;
   determining the second time domain index associated with the type of sequence based on the at least one offset value; and
   determining at least one sequence based at least in part on the second time domain index.

2. The method according to claim 1, wherein the type of sequence is one of a physical uplink control channel (PUCCH) sequence, a physical downlink shared channel (PDSCH) demodulation reference signal (DMRS) sequence, a physical uplink shared channel (PUSCH) DMRS sequence, a sounding reference signal (SRS) sequence for transmission, or a SRS sequence for reception.

3. The method according to claim 1, wherein both the first time domain index and the second time domain index are in a unit of at least one of a slot or a symbol.

4. The method according to claim 1, wherein the at least one offset value is determined by common timing advance (TA) for uplink transmission.

5. The method according to claim 4, wherein the at least one offset value is calculated by rounding a corresponding value of the common TA to a number of at least one slot and symbol with respect to a subcarrier spacing (SCS) associated with the type of sequence.

6. The method according to claim 1, wherein the at least one offset value is explicitly configured by at least one of radio resource control (RRC) signaling, medium access control (MAC) control element (CE) or downlink control information (DCI) associated with the type of sequence.

7. The method according to claim 1, wherein:
   the type of sequence is one of a physical downlink shared channel (PDSCH) demodulation reference signal (DMRS) sequence or a physical uplink shared channel (PUSCH) DMRS sequence; and
   the at least one offset value is implicitly determined by one of DMRS port information or DMRS scrambling identifier information in at least one of radio resource control (RRC) signaling or downlink control information (DCI) associated with the kind of sequence.

8. The method according to claim 1, wherein the at least one offset value is one of configured for separated different types of sequences or shared among different types of sequences.

9. An apparatus, comprising:
a receiving circuitry;
a transmitting circuitry; and
a processor coupled to the receiving circuitry and the transmitting circuitry configured to cause the apparatus to:
receive configuration information indicating at least one offset value associated with a type of sequence, the at least one offset value corresponding to a second time domain index that is offset relative to a first time domain index determined based on a synchronization signal block (SSB) associated with the type of sequence;
determine the second time domain index associated with the type of sequence based on the at least one offset value; and
determine at least one sequence based on the second time domain index.

10. The apparatus of claim 9, wherein the type of sequence is one of a physical uplink control channel (PUCCH) sequence, a physical downlink shared channel (PDSCH) demodulation reference signal (DMRS) sequence, a physical uplink shared channel (PUSCH) DMRS sequence, a sounding reference signal (SRS) sequence for transmission, or a SRS sequence for reception.

11. The apparatus of claim 9, wherein both the first time domain index and the second time domain index are in a unit of at least one of a slot or a symbol.

12. The apparatus of claim 9, wherein the at least one offset value is determined by common timing advance (TA) for uplink transmission, and the at least one offset value is calculated by rounding a corresponding value of the common TA to a number of at least one slot and symbol with respect to a subcarrier spacing (SCS) associated with the type of sequence.

13. The apparatus of claim 9, wherein the at least one offset value is explicitly configured by at least one of radio resource control (RRC) signaling, medium access control (MAC) control element (CE), or downlink control information (DCI) associated with the type of sequence.

14. The apparatus of claim 9, wherein the at least one offset value is one of configured for separated different types of sequences or shared among different types of sequences.

15. An apparatus, comprising:
a receiving circuitry;
a transmitting circuitry; and
a processor coupled to the receiving circuitry and the transmitting circuitry configured to cause the apparatus to:
configure information indicating at least one offset value associated with a type of sequence, the at least one offset value corresponding to a second time domain index that is offset relative to a first time domain index determined based on a synchronization signal block (SSB) associated with the type of sequence;
determine the second time domain index based on the at least one offset value; and
determine at least one sequence associated with the type of sequence based at least in part on the second time domain index.

16. The apparatus of claim 15, wherein the type of sequence is one of a physical uplink control channel (PUCCH) sequence, a physical downlink shared channel (PDSCH) demodulation reference signal (DMRS) sequence, a physical uplink shared channel (PUSCH) DMRS sequence, a sounding reference signal (SRS) sequence for transmission, or a SRS sequence for reception.

17. The apparatus of claim 16, wherein, for the type of sequence is one of the PDSCH DMRS sequence or the PUSCH DMRS sequence, the at least one offset value is determined by one of DMRS port information or DMRS scrambling identifier information in at least one of radio resource control (RRC) signaling or downlink control information (DCI) associated with the type of sequence.

18. The apparatus of claim 15, wherein both the first time domain index and the second time domain index are in a unit of at least one of a slot or a symbol.

19. The apparatus of claim 15, wherein the at least one offset value is determined by common timing advance (TA) for uplink transmission, and the at least one offset value is calculated by rounding a corresponding value of the common TA to a number of at least one slot and symbol with respect to a subcarrier spacing (SCS) associated with the type of sequence.

20. The apparatus of claim 15, wherein the at least one offset value is explicitly configured by at least one of radio resource control (RRC) signaling, medium access control (MAC) control element (CE), or downlink control information (DCI) associated with the type of sequence.

* * * * *